No. 884,112. PATENTED APR. 7, 1908.
F. F. UEHLING.
SPEED INDICATOR AND RECORDER.
APPLICATION FILED DEC. 13, 1906.

2 SHEETS—SHEET 2.

WITNESSES:

INVENTOR

ATTORNEY

UNITED STATES PATENT OFFICE.

FRITZ F. UEHLING, OF PASSAIC, NEW JERSEY.

SPEED INDICATOR AND RECORDER.

No. 884,112.          Specification of Letters Patent.          Patented April 7, 1908.

Application filed December 13, 1906. Serial No. 347,652.

*To all whom it may concern:*

Be it known that I, FRITZ FREDERICK UEHLING, a citizen of the United States of America, and resident of the city of Passaic, county of Passaic, and State of New Jersey, have invented certain new and useful Improvements in Speed Indicators and Recorders, of which the following is a specification.

My invention relates to speed indicating and recording devices.

The object of my invention is to provide a device of this class which shall be simple and effective in its construction and operation and which shall be capable of being adapted to accurately indicate and record very high and very low speeds and one in which a wide range of speeds may be indicated and recorded by the same instrument.

My invention consists broadly in providing means for connecting a movable member with the member whose speed is to be indicated or recorded in such a way that the movable member will tend to partake of the motion of the member whose speed is to be indicated with a force which is proportional to said speed, and in providing means for indicating and recording the magnitude of said force and thereby the speed.

More particularly my invention consists in providing a movable frame in which a fan or similar device is revolubly mounted in geared connection with the member whose speed is to be indicated in such a way that an effort is exerted upon the movable frame tending to move it out of its normal position an amount proportional to the speed of the member whose speed is to be indicated and recorded, and in providing an indicator and recording means for the same.

Figure 1:
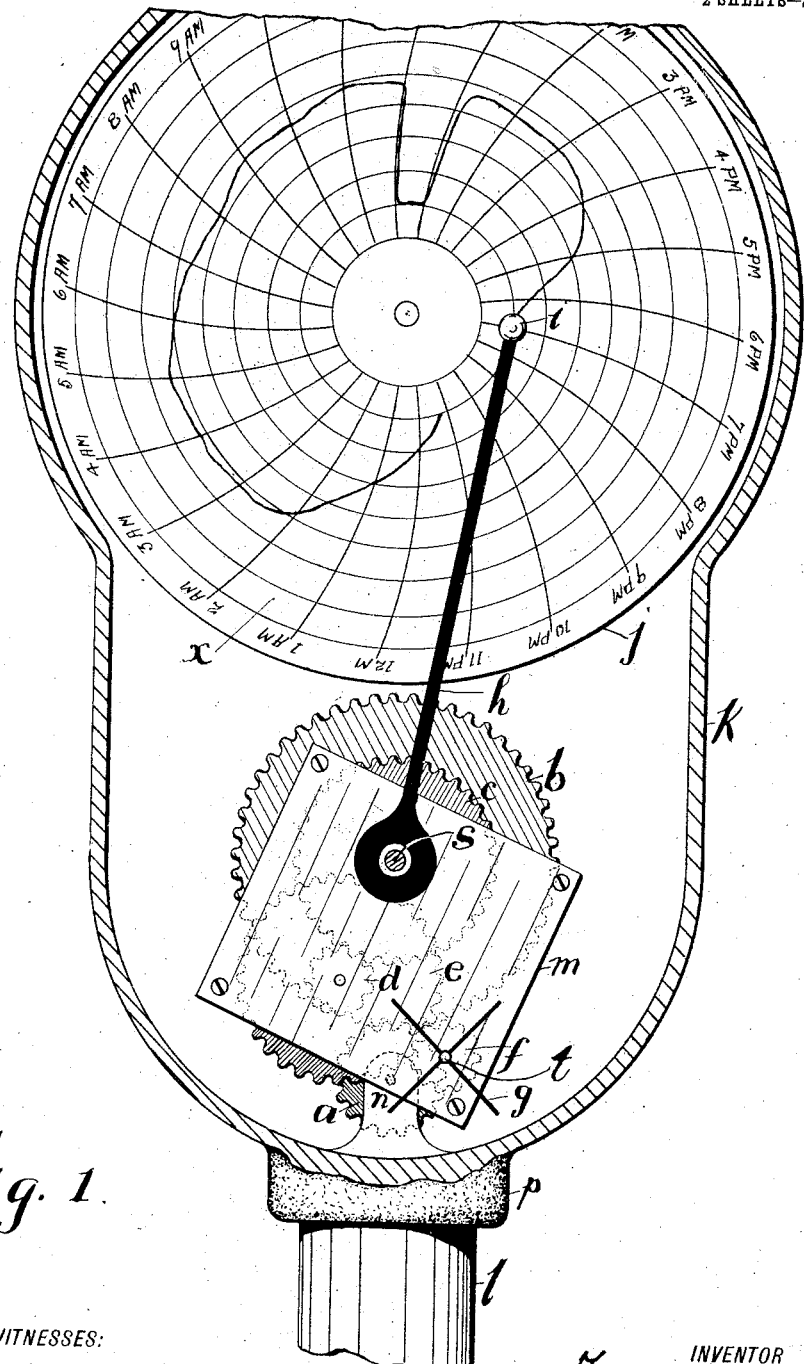
Figure 2:
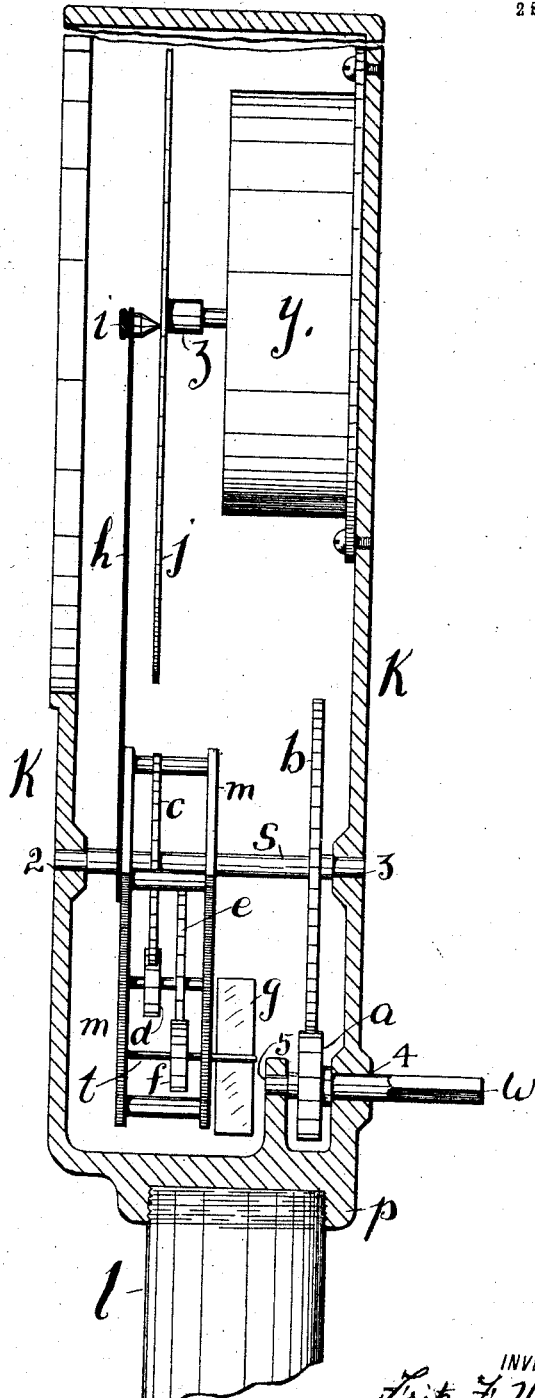

In the drawings accompanying and forming a part of this specification, Figure 1 is a front view partially in section, Fig. 2 is a partial section through the center of the device in a plane at right angles to the plane of Fig. 1.

The reference characters are used in the same sense in the drawings and the specification.

The mechanism is mounted in a case $k$ adapted to be secured to a support 1. A shaft $w$ is mounted in the bearings 4 and 5, in this case having its end projecting outside of the case, and adapted to be connected in any convenient manner with the element whose speed is to be indicated and recorded. A pinion $a$ is fixed to this shaft inside of the case and meshes to the gear $b$ on the shaft $s$ mounted in the bearings 2, 3 in the case. A frame $m$ is pivotally mounted on the shaft $s$ and carries a train of gears $d$, $e$ and $f$; the first member $d$ being in mesh with a gear $c$ on the shaft $s$. The shaft $s$ is loose in the frame $m$ so that the frame swings or turns freely upon the shaft. The last wheel of this train is fixed to the shaft $t$, to which is also secured the vane or fan $g$. The result of these connections being that assuming that the frame is held stationary the fan $g$ will be revolved when the shaft $w$ is revolved. An indicating arm or pointer $h$ is secured to the frame $m$ and is provided at its upper end with a marking point $i$. A revoluble chart $j$ connected with an appropriate clock movement $y$ is mounted in the case so as to bring the plane of the chart in operative relation to the marking point. The frame $m$ is pivoted to the shaft $s$ at a point above its center of gravity and the indicating arm $h$ is secured to the frame at such an angle as to bring the marking point $i$ on the zero line of the chart when the center of gravity of the frame is directly under its pivot. Whenever the frame is swung out of this position the force of gravity will exert a turning moment upon it tending to restore it, and this moment will be proportional to the amount of movement or more specifically to the sine of the angle through which the frame is rotated from its central position, as is well understood.

If the shaft $t$ and the train of gears which connects it with the shaft $s$ offered no resistance the frame $m$ would remain in its zero position when the shaft $w$ is revolved. The fan $g$, however, on account of the motion which it sets up in the medium surrounding it will offer a resistance to motion which will increase as the speed increases and this resistance will tend to swing the frame out of its zero position until the turning moment which the force of gravity exerts in the opposite direction balances it. It is thus seen that for any particular speed of the shaft $w$ the frame $m$ will be swung out of its normal or zero position to a position where the resisting action of the fan and the action of gravity are equal, and that there will be a certain definite position of the frame relative to the case and consequently of the indicator and its marking point for any given speed of the shaft $w$.

The chart $j$ is provided with a series of concentric circles to indicate the various speeds and with radiating arcs to indicate the time. As shown, the chart is arranged to make one complete revolution in twenty-four hours.

It will be seen that my invention provides a means for indicating at all times and for providing a continuous record of the speed of the shaft $w$ and consequently any revolving member with which it is connected.

I have here shown a form of mechanism in which gravity acts as the force opposing the movement of the frame produced by the revolution of the fan, but it is obvious that a spring or other form of resistance would be adapted for the same purpose.

The medium in which the fan revolves may be of air, or of any liquid such as oil.

Having thus described my invention what I claim is:

1. In a speed indicator and recorder the combination with a frame pivoted on an axis eccentric to its center of gravity of a rotatable shaft co-axial with said axis, a rotary resistance producing member journaled in said frame and geared connections between said shaft and said rotary resistance producing member.

2. In a speed indicator and recorder the combination with a rotatable shaft of a swinging frame adapted to turn about the axis of said shaft and means mounted in said frame and connected with said shaft adapted to exert a turning moment upon said frame proportional to the speed of said shaft.

3. In a speed recorder the combination with a frame pivoted at a point normally above its center of gravity of a shaft whose axis passes through said point adapted to be connected with the element whose speed is to be recorded and means mounted in said frame and connected with said shaft adapted to oppose the turning moment produced by the action of gravity of said frame with a resistance varying with the variations in the rotative speed of said shaft.

4. In a speed indicating and recording device the combination with a revoluble shaft of a frame pivoted on said shaft, means mounted in said frame and connected with said shaft adapted to oppose the relative motion of said frame and shaft with a resistance proportionate to the speed of said shaft, an indicating arm connecting with said frame and a chart mechanism in operative relation with said indicating arm.

5. In a speed indicating device the combination with a revoluble shaft of a frame pivoted co-axially with said shaft and a fan revolubly in said frame in geared connection with said shaft and means for recording the position of said frame.

In testimony whereof, I have signed my name to this specification in the presence of two subscribing witnesses.

F. F. UEHLING.

Witnesses:
C. A. CONTAN,
ERNEST MILLER.